United States Patent [19]
Koinuma et al.

[11] Patent Number: 6,013,153
[45] Date of Patent: Jan. 11, 2000

[54] PROCESS FOR SURFACE TREATMENT OF VULCANIZED RUBBER AND PROCESS FOR PRODUCTION OF RUBBER-BASED COMPOSITE MATERIAL

[75] Inventors: Hideomi Koinuma, Tokyo; Yukihiro Kusano, Kokubunji; Masato Yoshikawa; Nobuko Kato, both of Kodaira; Kazuo Naito, Kawasaki, all of Japan

[73] Assignees: Bridgestone Corporation; Hideomi Koinuma, both of Tokyo, Japan

[21] Appl. No.: 09/060,255

[22] Filed: Apr. 15, 1998

Related U.S. Application Data

[63] Continuation-in-part of application No. 08/796,215, Feb. 7, 1997, abandoned.

[30] Foreign Application Priority Data

Feb. 8, 1996 [JP] Japan ........................................ 8-46661

[51] Int. Cl.$^7$ .............................. B32B 31/20; H05H 1/46
[52] U.S. Cl. .................................... 156/272.6; 156/273.3; 156/275.7; 264/483
[58] Field of Search .............................. 156/272.6, 273.3, 156/275.7, 272.2; 315/111.11, 111.51; 427/536, 539; 313/231.51; 219/121.4, 121.41; 118/723 ER; 422/186.05; 264/483

[56] References Cited

U.S. PATENT DOCUMENTS

| | | | |
|---|---|---|---|
| 5,198,724 | 3/1993 | Koinuma et al. | 315/111.21 |
| 5,290,378 | 3/1994 | Kusano et al. | 156/272.6 |
| 5,316,739 | 5/1994 | Yohikawa | 422/186.05 |
| 5,466,424 | 11/1995 | Kusano et al. | 427/536 |
| 5,549,780 | 8/1996 | Koinuma et al. | 156/346 |

FOREIGN PATENT DOCUMENTS

| | | |
|---|---|---|
| 575260 | 12/1993 | European Pat. Off. . |
| 606014 | 7/1994 | European Pat. Off. . |
| 5275190 | 10/1993 | Japan . |
| 5275191 | 10/1993 | Japan . |
| 5275193 | 10/1993 | Japan . |
| 2259185 | 3/1993 | United Kingdom . |

*Primary Examiner*—Michael W. Ball
*Assistant Examiner*—Michael A Tolin
*Attorney, Agent, or Firm*—Sughrue, Mion, Zinn Macpeak & Seas, PLLC

[57] ABSTRACT

A process for surface treatment of a vulcanized rubber is disclosed, said process comprising: generating a nonequilibrium low-temperature plasma under atmospheric pressure between a cathode and an insulating dielectric which is interposed between the cathode and an anode while introducing a gas for generating plasma to a plasma-generating region between the cathode and the insulating dielectric, placing the vulcanized rubber in air and outside the plasma-generating region so that a surface of the vulcanized rubber faces the plasma-generating region, and directing the gas from the plasma-generating region toward the surface of the vulcanized rubber so that the gas impinges against the rubber surface for effecting surface treatment.

16 Claims, 2 Drawing Sheets

PROCESS FOR SURFACE TREATMENT OF VULCANIZED RUBBER AND PROCESS FOR PRODUCTION OF RUBBER-BASED COMPOSITE MATERIAL

CROSS REFERENCE TO RELATED APPLICATION

This application is a continuation-in-part of copending application Ser. No. 08/796,215 filed on Feb. 7, 1997, now abandoned, the entire contents of which are hereby incorporated by reference.

BACKGROUND OF THE INVENTION

1. Field of the Invention

The present invention relates to a process for surface treatment of vulcanized rubber and a process for production of rubber-based composite material.

2. Prior Art

Surface treatment or surface modification is commonly used in various fields to make a substrate hydrophilic, water-repellent, or adherent. For example, surface treatment is performed on vulcanized rubber to be coated with a paint or to be bonded to any other material such as rubber, metal, and plastics for the production of composite materials. There are several kinds of surface treatments.

A known process for surface treatment of vulcanized rubber to be made adherent consists of intensively oxidizing the surface of vulcanized rubber with a strong acid or a strong oxidizing agent, thereby making minute cracks over the entire surface. This process suffers the disadvantage that a strong acid or strong oxidizing agent needs a great care for its handling and remarkably damages the surface of vulcanized rubber. Moreover, it does not make vulcanized rubber adherent sufficiently.

There are other known processes for surface treatment, which consist of exposing vulcanized rubber to chlorine gas, dipping vulcanized rubber in chlorine gas-bubbling water, or treating vulcanized rubber with a halogen compound. (See Japanese Patent Publication No. 36910/1977.) These processes are based on the principle that chlorine attacks double bonds in rubber to form chlorine-containing groups required for adhesion. The disadvantage is that the treated surface is resinified when treated rubber (NR or SBR) is combined with other material (such as metal and resin) to give rubber vibration isolators. The resinified surface poses a problem with poor adhesion and poor heat resistance. Another disadvantage is the yellowing of the treated surface. For example, yellowing occurs when the above-mentioned surface treatment is applied to the golf ball cover of vulcanized rubber whose main component is balata (trans-polyisoprene). This yellowing adversely affects the appearance of the coated golf ball. In addition, treatment with chlorine gas or halogen compound involves the possibility of causing an environmental problem.

There is another process for surface treatment of vulcanized rubber which is designed to activate the surface by etching with low-pressure glow plasma in oxygen or a mixture of oxygen and $CF_4$. This process is capable of uniform surface treatment. However, it needs a large vacuum equipment (for 10 Torr or below) when it is put to industrial use and it also needs a great installation cost and running cost for continuous operation. In addition, treatment with plasma may not produce the desired effect because oil and water are released from the surface of vulcanized rubber in the atmosphere of reduced pressure. Moreover, plasma is liable to generate heat during treatment, and hence it cannot be readily applied to a substrate having a low melting point.

The same problem as mentioned above is also involved in the industrially established corona treatment.

In order to address the above-mentioned problems, the present applicant proposed in Japanese Patent Laid-open No. 202208/1993 corresponding to U.S. Pat. No. 5,316,739 a process for treating the surface of vulcanized rubber with plasma of a gas of halogen-containing molecules or oxygen-containing molecules under atmospheric pressure. Requiring no solvents, this process is capable of surface treatment in a simple manner without environmental pollution. In addition, treatment by this process makes the surface more adherent than low-pressure glow plasma treatment by the conventional process. Another advantage of this process is that treatment only affects the thin surface layer, leaving the bulk of vulcanized rubber intact.

However, the plasma treatment under atmospheric pressure suffers the disadvantage of requiring a large amount of helium to dilute the treating gas for stable discharging. In addition, the plasma treatment needs a special power unit and precludes using the general-purpose power unit for corona treatment or low-pressure plasma treatment because its impedance at the time of discharge is lower than that of corona treatment and higher than that of low-pressure plasma treatment. These disadvantages lead to a high treatment cost.

SUMMARY OF THE INVENTION

The present invention was completed in view of the foregoing. It is an object of the present invention to provide a process for efficient, satisfactory surface treatment of vulcanized rubber and a process for production of rubber-based composite material.

In order to achieve the above-mentioned object, the present inventors carried out a series of researches to find a process capable of satisfactory surface treatment or modification by a simple apparatus under atmospheric pressure.

The first aspect of the present invention provides a process for surface treatment of a vulcanized rubber, said process comprising:

generating a nonequilibrium low-temperature plasma under atmospheric pressure between a cathode and an insulating dielectric which is interposed between the cathode and an anode while introducing a gas for generating plasma to a plasma-generating region between the cathode and the insulating dielectric, placing the vulcanized rubber in air and outside the plasma-generating region so that a surface of the vulcanized rubber faces the plasma-generating region, and directing the gas from the plasma-generating region toward the surface of the vulcanized rubber so that the gas impinges against the rubber surface for effecting surface treatment.

The second aspect of the present invention provides a process for production of rubber-based composite material, said process comprising bonding a material to the surface of vulcanized rubber, which has been treated by the process mentioned above, directly or indirectly with an adhesive interposed between them.

The process of the present invention is capable of surface treatment under atmospheric pressure and hence dispenses with a large-scale apparatus and complex auxiliary equipment. In addition, the process permits continuous treatment and makes it possible to active the surface of vulcanized rubber so that the treated surface is hydrophilic and adherent with an affinity for adhesive and others.

DETAILED DESCRIPTION OF THE INVENTION

Figure 1:
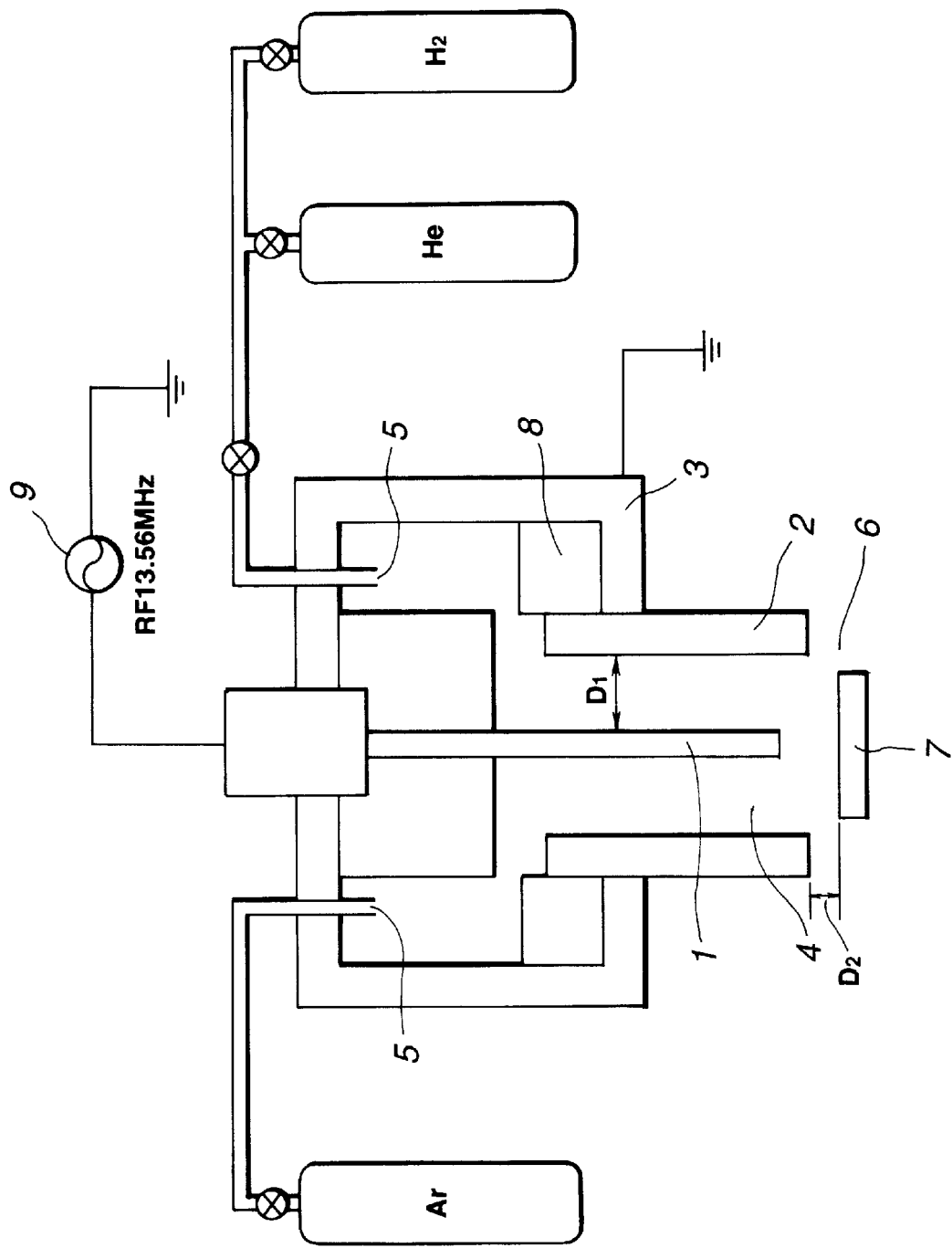
FIG. 1 is a schematic sectional view showing an example of the apparatus used to practice the present invention.

The present invention will be described in more detail with reference to FIGS. 1 and 2. The process of the present invention comprises generating nonequilibrium low-temperature plasma under atmospheric pressure between a cathode 1 and an insulating dielectric 2 which is interposed between the cathode 1 and an anode 3.

In this case, a gas for generating the plasma is introduced into a plasma-generating region 4 between the cathode 1 and the dielectric 2 through a gas inlet 5. The gas then flows from the plasma-generating region 4 to the air 6 which is outside the plasma-generating region 4. The vulcanized rubber 7 to be surface treated is placed in the air 6 and outside the plasma-generating region 4, preferably in proximity thereto, so that a surface of the vulcanized rubber 7 faces the plasma-generating region 4, whereby the gas flown out from the plasma-generating region 4 impinges against the surface of the vulcanized rubber 7 to effect surface treatment thereof.

In the figures, there are also shown a spacer 8 and a high-frequency power unit 9.

The nonequilibrium low-temperature plasma is a cold plasma of glow discharge type and, in general, a glow discharge plasma generated at an electron temperature of $10^3$ to $10^{6°}$ K. and a gas temperature of hundreds of Kelvin temperature (° K.), which is substantially different from the arc plasma that can be generated at atmospheric pressure.

The distance $D_1$ between the cathode 1 and the dielectric 2 (i.e., the space of the plasma-generating region 4) should preferably be 0.05 to 30 mm, more preferably 0.5 to 5 mm. Such a narrow space can ensure the generation of a high dense plasma of a power density of about $10^7$ to $10^{11}$ W/m$^3$, especially about $10^8$ to $10^{10}$ W/m$^3$, thereby obtaining a highly reactive plasma.

A plasma-generating gas is introduced through the gas inlet 5 to the plasma-generating region 4 at a flow rate of 0.01 l/min to 100 l/min, especially 0.1 l/min to 10 l/min. The speed of the plasma-generating gas is preferably $10^{-6}$ to $10^4$ m/sec, more preferably $10^{-4}$ to $10^3$ m/sec, most preferably $10^{-3}$ to $10^2$ m/sec. The gas is then flown out from the plasma-generating region 4 to the air 6 which is outside the plasma-generating region 4. The gas stream having such a high speed is reached to the vulcanized rubber 7 which is placed in air 6 and outside the plasma-generating region 4 before the plasma becomes deactivated, whereby the vulcanized rubber 7 is effectively surface treated in spite that the vulcanized rubber-placing region (air 6) does not have any electrodes or other apparatuses for generating plasma.

In the present method, the vulcanized rubber 7 is not placed in the plasma-generating region 4. Thus, since the method is not a surface treatment in a discharge region, there can be used a small-sized plasma-generating apparatus having a narrow plasma-generating region or discharge region which can generate a dense plasma. By using the dense plasma, the vulcanized rubber is efficiently surface treated with a highly treating effect although the vulcanized rubber 7 is placed in air 6 and outside the plasma-generating region 4. Furthermore, when the vulcanized rubber is placed in the plasma-generating region or discharge region, the whole surface of the vulcanized rubber is treated. A partial surface treatment is difficult or impossible. On the other hand, according to the present invention, since the vulcanized rubber is placed outside the plasma-generating region or discharge region, and only the surface portion of the vulcanized rubber against which the gas impinges is treated, a partial surface treatment is easily conducted.

The cathode is made of conductive material, such as corrosion-resistant metal, which includes Al, Ti, Cr, Ni, Cu, W, Pt, Pd, and alloys thereof (particularly stainless steel, Cu—Zn, Cu—Al, Co—Cu, etc.). of these metals, Pt, Pd, W, and stainless steel are desirable, and Pt is particularly desirable.

The anode is made of any of Cu, Al, stainless steel, steel, and brass. However, any other conductive materials may be used.

The dielectric functions to generate and sustain the nonequilibrium low-temperature plasma in a stable manner under atmospheric pressure. It may be formed from any of quartz, $Al_2O_3$, YSZ, $SrTiO_3$, $PbTiO_3$—PbZnO, and pyrex glass. $Al_2O_3$, quartz, and pyrex glass are commonly used. The thickness of the dielectric is preferably 0.1 to 10 mm, more preferably 0.3 to 3 mm.

An AC power supply is used to generate the nonequilibrium low-temperature plasma according to the present invention. The frequency of the power supply may range from 1 to $10^{10}$ Hz, more preferably 50 to $3 \times 10^9$ Hz. A commonly used frequency is 13.56 MHz.

Stable discharge can be readily produced by using as the gas for generating the plasma a rare gas such as helium and argon. Argon effectively functions as the main gas to be passed through the apparatus, with the AC power supply or radio-frequency oscillator energized. Air, nitrogen, and oxygen may also be used as the main gas so long as they permit the stable discharge.

The main gas such as helium and argon may be incorporated with a reactive gas. The amount of the reactive gas for 100 parts by volume of the main gas (especially, argon) should be less than 1000 parts by volume, preferably less than 100 parts by volume, and more preferably less than 10 parts by volume. The incorporation with the reactive gas is intended to introduce functional groups into the surface of vulcanized rubber. From this point of view, it is preferable to incorporate the reactive gas in an amount of at least 0.0001 part by volume, preferably 0.01 part by volume, more preferably 0.1 part by volume per 100 parts by volume of the main gas.

The reactive gas for surface activation includes, for example, $N_2$, $O_2$, $H_2O$, $CO_2$, CO, $H_2$, $NH_3$, air, $CF_4$, $SF_6$, $NF_3$, Freon gas, silane, $CH_4$, $C_2H_6$, ketones, phenols, alcohols, ethers, and chlorinated hydrocarbon (such as $CCl_4$, $CHCl_3$, and $CH_2Cl_2$), which are used for ordinary process plasma. Of these examples, $N_2$, $O_2$, and air are preferable from the economical and environmental point of view, and $O_2$ is particularly desirable.

The flow rate of gas depends on the size of apparatus and the treatment required. It is usually 50–1000 sccm, preferably 100–600 sccm; however, it may vary according as the apparatus becomes larger or smaller.

According to the present invention, the nonequilibrium low-temperature plasma is formed under atmospheric pressure (about 760 Torr) and the treatment is carried out under atmospheric pressure. During treatment, the substrate may be cooled if there is the possibility that the substrate is thermally damaged due to an extended treating time or an excessively large input power.

Figure 2:
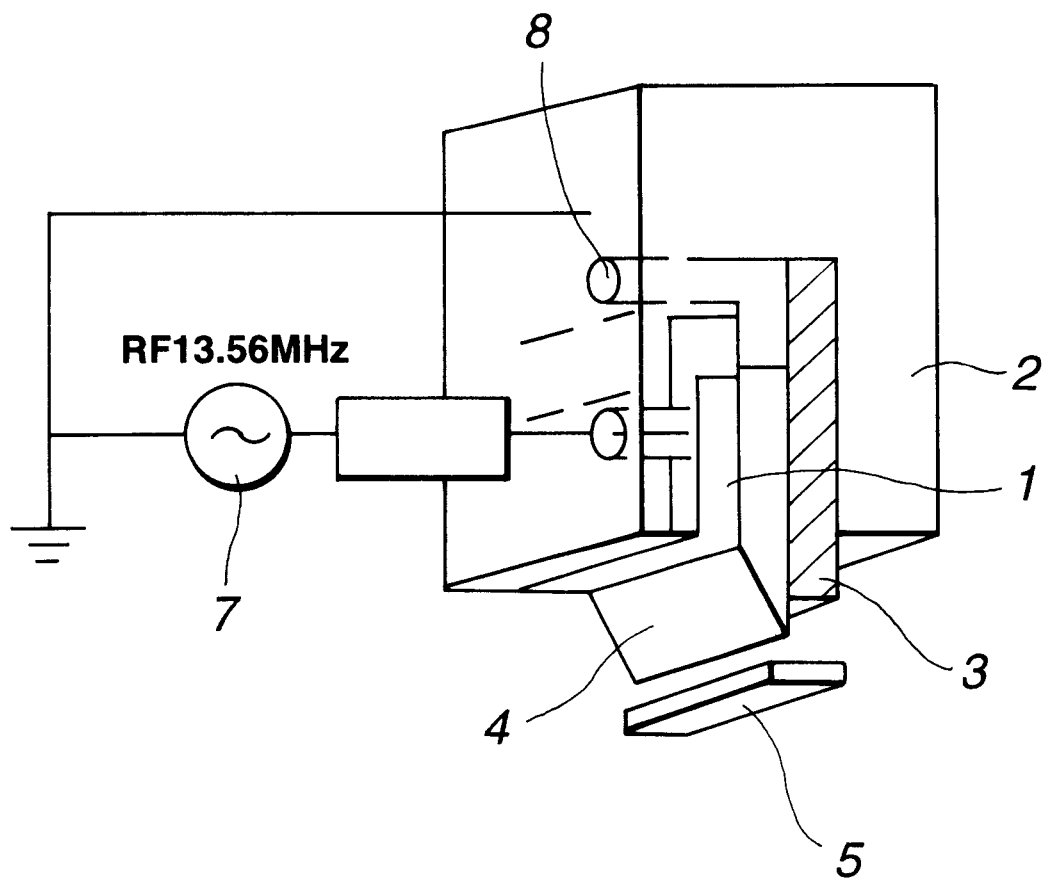
FIG. 2 is a schematic perspective view showing another example of the apparatus used to practice the present invention.

The plasma generating apparatus used in the present invention is shown in FIGS. 1 and 2. The one shown in FIG. 2 is capable of generating sheetlike plasma. A typical example of such apparatus is described in Japanese Patent Laid-open No. 212253/1992 corresponding to U.S. Pat. No. 5,198,724, Japanese Patent Laid-open No. 242924/1992 corresponding to U.S. Pat. No. 5,221,427 and U.S. Pat. No. 5,369,336, and Appl. Phys. Lett., 60 (7), Feb. 17, 1992.

During treatment, the vulcanized rubber is placed in air and outside the plasma-generating region, preferably in proximity to the plasma-generating region. In this case, the vulcanized rubber is preferably placed in air 6 so that the distance $D_2$ between the vulcanized rubber 7 and the outer end of the plasma-generating region 4 is preferably from more than 0 mm to 100 mm, more preferably 0.5 to 50 mm, most preferably 0.5 to 30 mm.

It is possible to carry out treatment in a stripy pattern by scanning the vulcanized rubber or the plasma generating apparatus. It is also possible to mechanically feed the cathode according as it consumes.

There are no specific restrictions on the kind of vulcanized rubber for surface treatment. Examples of the vulcanized rubber include natural rubber (NR), styrene-butadiene rubber (SBR), acrylonitrile-butadiene rubber (NBR), chloroprene rubber (CR), isoprene rubber (IR), isobutylene-isoprene rubber (IIR), ethylene-propylene-diene rubber (EPDM), and butadiene rubber (BR).

Upon surface treatment with the nonequilibrium low-temperature plasma, the vulcanized rubber has a highly activated surface to which any other material can be bonded directly or indirectly by the aid of adhesive. The material to be bonded includes rubber similar or dissimilar to the vulcanized rubber, plastics, metal, ceramics, and semiconductor. The bonding of rubber may be accomplished by placing unvulcanized rubber on the treated surface of the vulcanized rubber and heating it under pressure. The bonding of plastics (such as nylon), metal, and semiconductor may be accomplished by the aid of adhesive. It is possible to bond plastics directly (without adhesive) by injecting plastics onto the treated surface as mentioned later. The adhesive may be of natural type or synthetic type, depending on the intended application. A polyurethane-based adhesive is desirable.

The present invention will be applied to the surface treatment of balata-covered golf balls to be coated with a urethane-based paint, epoxy resin-based paint, or polyamide-based paint. The surface treatment provides good adhesion between the ball surface and the coating film.

The present invention may also be applied to the production of rubber vibration isolators. In this case, the surface treatment of vulcanized rubber is followed by:

(1) injection of plastics (such as nylon) onto the treated surface for direct adhesion;
(2) application of an adhesive (such as phenolic adhesive) to the treated surface and subsequent injection of plastics (for stronger bonding than (1)); or
(3) application of an adhesive to the treated surface and bonding of metal.

In addition, the present invention may be applied to the production of rubber-based composite materials such as retreaded tires. In this case, the surface treatment of vulcanized rubber is followed by the bonding of unvulcanized tread rubber under pressure with heating.

EXAMPLE

The invention will be described in more detail with reference to the following Examples and Comparative Examples which are not intended to restrict the scope of the invention.

Examples 1 to 9 and Comparative Example

A sheet was formed from a rubber compound of the following composition. Upon vulcanization at 150° C. for 30 minutes, there was obtained a rubber sheet measuring 15 mm wide, 80 mm long, and 2.0 mm thick.

Composition of Rubber Compound

| | |
|---|---|
| NR | 80 parts by weight |
| SBR | 20 |
| Sulfur | 5 |
| Zinc oxide | 10 |
| Stearic acid | 1 |
| Carbon black | 30 |
| Calcium carbonate | 100 |
| Accelerator (sulfenamide) | 0.2 |
| Accelerator (thiazole) | 2.0 |

The resulting sheet underwent surface treatment under the conditions shown in Table 1 with the apparatus shown in FIG. 1. In this case, the distance $D_1$ between the cathode and the dielectric was 5 mm, and the distance $D_2$ between the sample (vulcanized rubber) and the outer end of the plasma-generating region was 10 mm. Two pieces of the surface-treated sheet were bonded together, with the treated surfaces facing each other, after coating the treated surface with a polyurethane-based adhesive. The adhesive was cured at room temperature for 72 hours. The resulting sample was tested for bond strength by the T-peel test. The results are shown in Table 1.

TABLE 1

| Example | Material of cathode | Pressure (Torr) | RF power (W) | Flow rate of argon (SCCM) | Reactive gas | Flow rate of reactive gas (SCCM) | Bond strength (N/m) |
|---|---|---|---|---|---|---|---|
| 1 | Pt | 760 | 70 | 300 | — | — | 980 |
| 2 | Pt | 760 | 70 | 300 | $O_2$ | 1.5 | 1925 |
| 3 | Pt | 760 | 70 | 300 | $O_2$ | 3.0 | 2170 |
| 4 | Pt | 760 | 70 | 300 | $O_2$ | 4.5 | 2322 |
| 5 | Pt | 760 | 70 | 300 | He, $O_2$ | 100, 4.5 | 2368 |
| 6 | Pt | 760 | 70 | 300 | $H_2$ | 2.0 | 915 |
| 7 | Pt | 760 | 70 | 300 | $N_2$ | 3.0 | 897 |

TABLE 1-continued

| Example | Material of cathode | Pressure (Torr) | RF power (W) | Flow rate of argon (SCCM) | Reactive gas | Flow rate of reactive gas (SCCM) | Bond strength (N/m) |
|---|---|---|---|---|---|---|---|
| 8 | Pt | 760 | 70 | 300 | CF$_4$ | 3.0 | 1343 |
| 9 | Pt | 760 | 70 | 300 | H$_2$O | 1.6 | 944 |
| Comparative Example | | | | Not treated | | | 280 |

It is noted from Table 1 that the samples in Examples are by far superior in bond strength to the untreated sample in Comparative Example.

We claim:

1. A process for surface treatment of vulcanized rubber, said process comprising:

generating a nonequilibrium low-temperature plasma by glow discharge under atmospheric pressure between a cathode and an insulating dielectric which is interposed between the cathode and an anode while introducing a gas for generating plasma to a plasma-generating region between the cathode and the insulating dielectric, placing the vulcanized rubber in air and outside the plasma-generating region so that a surface of the vulcanized rubber faces the plasma-generating region, and directing the gas from the plasma-generating region toward the surface of the vulcanized rubber so that the gas impinges against the rubber surface for effecting surface treatment, while keeping the vulcanized rubber in the air atmosphere.

2. The process of claim 1 wherein the distance between the cathode and the insulating dielectric is 0.05 mm to 30 mm.

3. The process of claim 1 wherein the vulcanized rubber is placed in air so that the distance between the vulcanized rubber and the outer end of the plasma-generating region is from more than 0 mm to 100 mm.

4. The process of claim 1 wherein the nonequilibrium low-temperature plasma is generated under atmospheric pressure by using an AC power supply while passing a rare gas between the cathode and the dielectric with or without a reactive gas selected from the group consisting of $N_2$, $O_2$, $H_2O$, $CO_2$, $CO$, $H_2$, $NH_3$, air, $CF_4$, $SF_6$, $NF_3$, Freon gas, silane, $CH_4$, $C_2H_6$, ketones, phenols, alcohols, ethers, and chlorinated hydrocarbons.

5. A process for production of rubber-based composite material, said process comprising bonding a material to the surface of vulcanized rubber which has been treated by the process defined in claim 1, directly or indirectly with an adhesive interposed between them.

6. The process of claim 1, wherein the nonequilibrium low-temperature plasma is generated by glow discharge at an electron temperature of $10^3$ to $10^6$ °K.

7. The process of claim 1, wherein the distance $D_1$ between the cathode and the dielectric is 0.05 to 30 mm.

8. The process of claim 1, wherein the distance $D_1$ between the cathode and the dielectric is 0.5 to 5 mm.

9. The process of claim 7, wherein the nonequilibrium low-temperature plasma generated by glow discharge is a high density plasma with a power density of about $10^7$ to $10^{11}$ W/m$^3$.

10. The process of claim 7, wherein the nonequilibrium low-temperature plasma generated by glow discharge is a high density plasma with a power density of about $10^8$ to $10^{10}$ W/m$^3$.

11. The process of claim 1, wherein the gas for generating plasma is introduced to the plasma-generating region at a flow rate of 0.01 l/m to 100 l/min.

12. The process of claim 1, wherein the gas for generating plasma is introduced to the plasma-generating region at a flow rate of 0.1 l/min to 10 l/min.

13. The process of claim 1, wherein the speed of the gas for generating plasma is $10^{-6}$ to $10^4$ m/sec.

14. The process of claim 1, wherein the speed of the gas for generating plasma is $10^{-4}$ to $10^3$ m/sec.

15. The process of claim 1, wherein the speed of the gas for generating plasma is $10^{-3}$ to $10^2$ m/sec.

16. The process of claim 1, wherein the surface of the vulcanized rubber is only partially treated.

* * * * *